United States Patent [19]

Burgdorf et al.

[11] 3,995,760
[45] Dec. 7, 1976

[54] MOTOR VEHICLE CONSTRUCTION

[75] Inventors: Günter Burgdorf, Stockheim; Klaus Egger-Büssing, Braunschweig, both of Germany

[73] Assignee: H. Bussing & Sohn, Braunschweig, Germany

[22] Filed: Apr. 16, 1975

[21] Appl. No.: 568,581

[30] Foreign Application Priority Data

Apr. 27, 1974 Germany .......................... 2420603

[52] U.S. Cl. .............................................. 214/515
[51] Int. Cl.² .......................................... B60P 1/64
[58] Field of Search ................ 214/515, 517, 38 D; 296/35 A; 254/45

[56] References Cited

UNITED STATES PATENTS

| 2,925,930 | 2/1960 | Parks | 214/515 |
|---|---|---|---|
| 3,152,709 | 10/1964 | Fowler | 214/515 |
| 3,430,793 | 3/1969 | Chapman | 214/515 |
| 3,737,135 | 6/1973 | Bertolini | 296/35 A X |
| 3,773,199 | 11/1973 | Arvidsson | 214/515 |
| 3,817,413 | 6/1974 | Ham | 214/515 |

FOREIGN PATENTS OR APPLICATIONS

| 2,102,034 | 11/1971 | Germany | 214/515 |

*Primary Examiner*—Albert J. Makay
*Attorney, Agent, or Firm*—Michael J. Striker

[57] ABSTRACT

A motor vehicle, such as a semi-trailer or the like, has an elongated load-supporting horizontal base frame having a first and a second end portion. A plurality of supporting legs are mounted on the base and pivotable between an upright orientation in which they engage the ground and a substantially horizontal upper retrated orientation. Mounting arrangements mount these legs on the base frame so that they can be shifted transversely of the elongation thereof underneath of the base frame, and laterally outwardly thereof, respectively. A vehicle-mountable chassis frame also has a first end portion and a second end portion; the latter slides under the cooperating first end portion of the base frame when the chassis frame is moved lengthwise beneath the base frame in order to support the latter when the legs are in the retracted position thereof. Guide ramps are provided on one or both of the cooperating end portions of the two frames, to facilitate the movement of the chassis frame underneath the base frame. A traverse extends across the chassis frame in the region of the second end portion of the same, and engaging portions on the base frame are provided which engage the transverse when the second end portion of the chassis frame moves beneath the second end portion of the base frame, so as to locate the frames relative to one another.

9 Claims, 4 Drawing Figures

MOTOR VEHICLE CONSTRUCTION

BACKGROUND OF THE INVENTION

The present invention relates generally to a motor vehicle construction, and more particularly to a mechanical changing system for containers or other detachable superstructures of motor vehicles, such as trucks, trailers or semitrailers.

It is already known to provide such motor vehicle constructions wherein a chassis frame is mounted on the vehicle and a base frame which carries a superstructure, such as a container, a truck or trailer body or the like, is provided with legs which can be folded from an upper retracted orientation to an upright orientation in which they are capable of supporting the base frame on the ground. The base frame is normally carried resting on top of the chassis frame when the base frame and superstructure are to be transported; however, when the base frame and superstructure are to be deposited somewhere, for example for loading or unloading, its legs are folded to upright position so that they can support the base frame and superstructure on the ground and the vehicle with the chassis frame thereon drives off, so that the chassis frame moves out from beneath the base frame and the vehicle can be used for other purposes, serviced, parked elsewhere, or the like.

Conventionally, the chassis frame is connected with the base frame carrying the container or other superstructure, by way of locking mechanisms which are released when the two frames are to be connected. The supporting legs of the base frame are mounted on bearing members which can be pulled laterally outwardly from the base frame before the supporting legs are folded down to upright position. Before folding can be accomplished, snap latches for the individual supporting legs, which have articulated lever supports are manually unlocked to permit the supports to pivot through between 10°–30° in the direction of the rear end of the base frame and to permit the legs to be moved to upright position. The length of the legs is adjustable, an operation which is carried out before they are fully moved to the upright position, i.e. after they have been pivoted through 10°–30°; thereafter they are further pivoted until they extend vertically. The simplest way of effecting the further pivoting is for the vehicle to be driven a very short distance in reverse, which causes the legs whose lower base plates have already been placed into light engagement with the ground, to be moved to fully upright position and to raise the base frame and container or superstructure on it by a corresponding amount. When the legs are in the fully upright position, locking devices automatically engage and latch them in this position. The vehicle can now be driven out from beneath the base frame.

For the reverse operation, namely in order to re-connect the base frame with the chassis frame, the vehicle is backed beneath the base frame until stopping blocks provided at the front end of the chassis frame come to rest against the front edge of the base frame. The two frames are then interlocked and the latching arrangements for the supporting legs are unlocked and as the vehicle subsequently is driven forwardly the legs pivot upwardly and the base frame, which is already loosely connected with the chassis frame, becomes lowered onto the latter. The legs are then folded to their fully retracted position, usually by first telescoping them together and then folding them upwardly, and their supporting members are pushed laterally beneath the base frame.

This prior-art approach has the great advantage that the disconnecting and connecting process is effected solely by mechanical means. Additional hydraulic or pneumatic devices are not at all required, and this results in savings in terms of production and maintenance costs, and also in respect of the unloaded weight of the vehicle so that the useful load factor for the vehicle is correspondingly increased.

It has, however, been found advantageous to have the stopping blocks provided on the chassis frame. These blocks must be relatively tall in order to reliably prevent the base frame or its container or superstructure from striking against the driver's cabin of the vehicle. It must be noted in this connection that the vehicle, when relieved of the base frame, is spaced quite a significant distance from the ground due to the fact that as the chassis frame moves out from beneath the base frame the springs located above the rear axle of the vehicle are freed of load and lift the vehicle. This means that in order to subsequently re-mount the base frame, or another similar base frame, the base frame must be raised to a corresponding level. Also, the mounting of the legs themselves has proved to be difficult in the prior art.

SUMMARY OF THE INVENTION

Accordingly, it is an object of the present invention to provide a motor vehicle construction of the type here under discussion, which avoids the aforementioned disadvantages.

More particularly, it is an object of the present invention to provide an improved mechanical changing system which permits disconnection of the base frame from the chassis frame of a load-carrying vehicle, and reconnection thereto, but is not possessed of the aforementioned disadvantages.

In keeping with these and other objects which will become apparent hereafter, one feature of the present invention resides, in a motor vehicle, in a combination comprising an elongated load-supporting horizontal base frame having a first and a second end portion. A plurality of foldable supporting legs is provided on the base frame and pivotable between an upright supporting orientation in which they engage the ground, and a substantially horizontal upper retracted orientation. Mounting means mounts these legs on the base frame for movement transversely of the elongation thereof between an inner position which they assume when in the retracted orientation and in which they are located beneath the base frame, and an outer position which they assume when in the upright orientation and in which they are laterally outwardly spaced from the base frame. A vehicle-mountable chassis frame also has a first end portion and a second end portion, the latter sliding under the cooperating first end portion of the base frame when the chassis frame is moved lengthwise beneath the base frame to support the latter when the legs are in the retracted orientation thereof. Guide ramps are provided on at least one of the cooperating end portions of the two frames for facilitating the movement of the chassis frame underneath the base frame. A traverse extends across the chassis frame in the region of the second end portion thereof, and engaging portions are provided on the base for engaging the traverse when the second end portion of the chassis frame moves beneath the second end portion of the base frame, so as to locate the frame relative to one another.

From the commencement of placing the base frame upon the chassis frame, the guide ramps ensure adequate loading of the rear axle of the vehicle having the chassis frame, and thus a sufficiently high frictional contact between the rear wheels and the ground. The traction force required for erecting the legs can therefore be reliably transmitted.

By means of the arrangement comprising the traverse and the engaging portions, the latter can be relatively flat in configuration, i.e. they need not be high. The strong retardation forces which are produced when the vehicle, having the base frame connected thereto, brakes while in motion, are transmitted without difficulty to the undercarriage by way of the cooperating traverse and engaging portions. Also, the coordination of the traverse and engaging portions and their cooperation gives rise to excellent centering of the base frame on the chassis frame and undercarriage, and assures exact alignment of the locking points where the two frames are locked together.

To enable an exchange of base frames (and hence of containers or superstructures carried thereon), even between different types of vehicles, the chassis frame in each case may be raised by shims or the like, to a sufficient extent to place it at the proper level where it can cooperate with the base frame. Thus, exchangeability of base frames with different types of vehicles having the chassis frame, and vice versa, is ensured.

Advantageously, the legs each are provided with a supporting strut one end of which is connected to the leg and the other end of which is connected to a slidable beam that can slide transversely of the elongation of the base frame from beneath the latter. This provides a high degree of rigidity which can be further increased if the respective pressure strut is rigidly mounted to the sliding member. The four corners of the base frame may be provided with mounting plates which are to be aligned with the corner fittings of a container unit, if such is to be carried on the base frame, and which are provided with one or more apertures for mounting a double-locking mechanism to connect the respective mounting plates with the corresponding corner fittings. This makes it possible, for example, to mount a standard container in a base frame of the present invention, even though the base frame may normally carry a superstructure in form of a trailer body. It is simply necessary to remove the side and top walls of the body, and of course these walls can be readily made removable for this purpose in known manner. Then, a standard container can be placed upon the base frame and secured thereto. This makes it possible to effect the placing of such a container onto the base frame, its transportation and subsequent removal, without requiring additional lifting equipment or the like. It merely needs four double locking devices, one at each corner of the container. Of course, instead of such a container, a tank, a silo, a box or any other special superstructure can be mounted in the same manner. Quick-connect couplings for hydraulic pipes or the like can be provided on the container and the base frame for cooperation with one another, if desired.

According to a further embodiment of the invention the base frame may also constitute the bottom wall of a container, and in this case the ramps and the engaging portions would then be directly mounted on the base of the container.

According to an advantageous embodiment of the invention the chassis frame may comprise two centering rails which extend longitudinally and with which two guide ramps of the base frame cooperate.

To increase the frictional contact between the lower ends of the supporting legs and the ground it is advantageous if the supporting legs, which carry at these free ends ground-engaging plates that are advantageously slightly upwardly curved, are provided at the end portion of the respective plate which faces the front end of the base frame with projections or any other form of roughened area.

Advantageously, each of the supporting legs may be composed of two sections which are telescoped into one another and which can be locked at various lengths by way of plugged connections or the like. Good protection against fouling and damage is afforded when the supporting legs are substantially received —when located in their upper retracted orientation— within the mounting member on which they are secured, and which for this purpose may have a U-shaped profile into which they can be retracted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
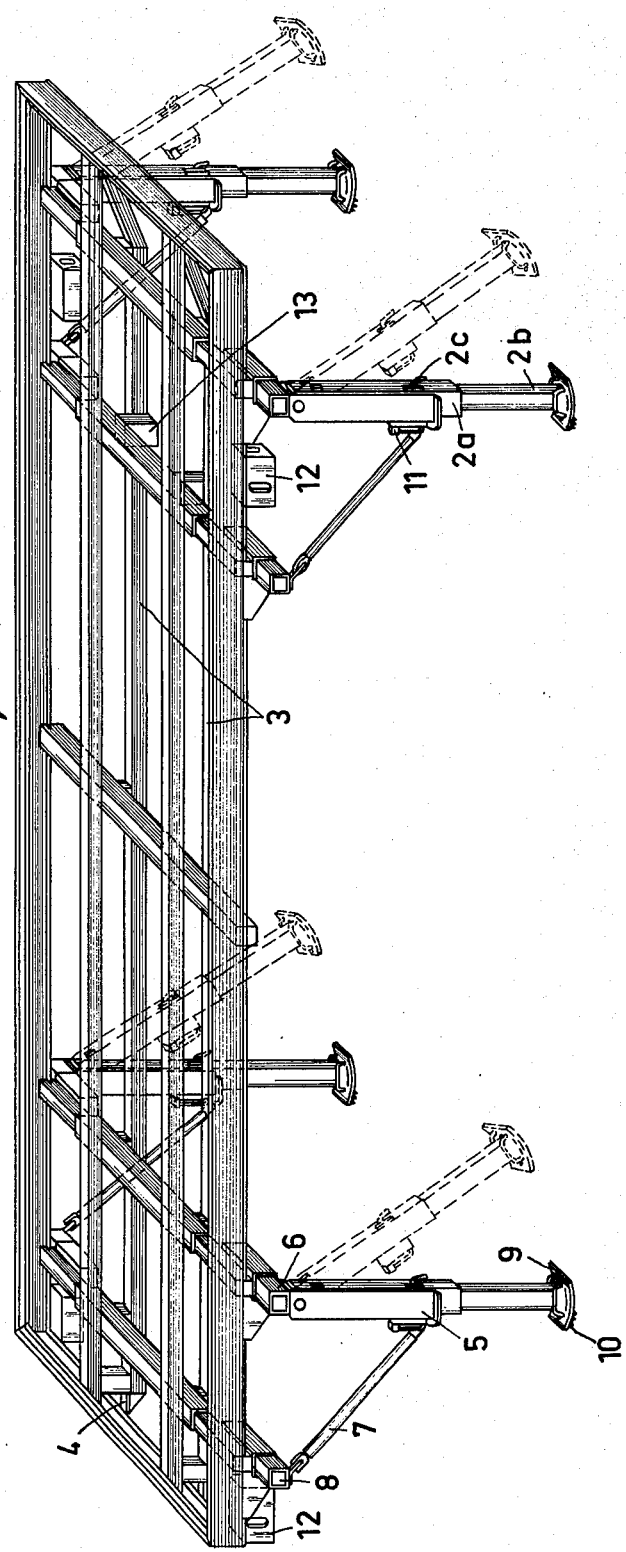
FIG. 1 shows a base frame having four supporting legs.

FIG. 1 shows a base frame having articulated supporting legs 2 which are shown in solid lines in supporting position and in broken line in a partly raised position. The base frame 1 has two longitudinally extending slide members or runners 3 which at their front ends are configurated with guide ramps 4 that are angled upwardly. Each of the supporting legs 2 is mounted in such a manner that it can pivot at its upper end on a bearing member 5 which is of U-shaped cross section and which can be horizontally displaced at right angles to the elongation of the base frame 1 by means of a slide-in member 6. Each member 5 can be locked in the desired laterally extended or inwardly retracted position by means of a locking mechanism (not shown) which may comprise a spring-loaded bolt that can be pulled out of cooperating openings in the members 5 and 6. Reinforcing struts 7 are connected to each member 5 and have their upper ends mounted on slide-in members 8 which in turn are mounted on the underside of the base frame and can be displaced in the same direction as the members 6.

Each of the legs 2 is composed of two sections 2a and 2b which are telescoped into one another and which can be locked at various extended positions by way of a plug connection 2c. A support plate 9 is provided at the lower end of the respective section 2b and is slightly outwardly curved and provided with projections 10 on that edge portion which faces the front end of the base frame 1. Each of the members 5 has a snap closure member 11 which secures the respective leg 2 in its solid-line supporting position shown in FIG. 1. The member 11 can be manually disengaged, and becomes automatically engaged in its supporting position when the leg 2 is either moved to fully upright position or to fully retracted upper horizontal position. The outer frame of the base frame 1 is provided at four locations with locking mechanisms 12, and with downwardly projecting engaging portions 13 that are located in the rear end portion of the base frame 1 beneath a traverse support.

Figure 2:
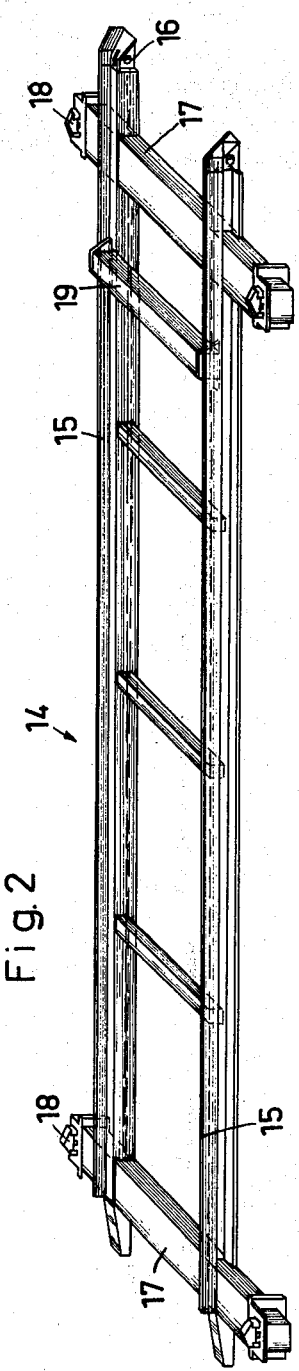
FIG. 2 shows a chassis frame for cooperation with the base frame in FIG. 1.

The chassis frame 14 which cooperates with the base frame 1 is shown in FIG. 2. Basically, it comprises two longitudinally extending centering rails 15 each having at its rear end a support roller 16. Four locking mechanisms 18, provided at the ends of two transverse sections 17, correspond to and cooperate with the locking mechanisms 12 of the base frame 1. Moreover, the rear end portion of the chassis frame 14 has a traverse member 19 extending across it, against whose rearwardly facing surface the engaging portions 13 of the base frame 1 abut when the two frames are located in superimposed relationship in which the frame 14 is located beneath the frame 1.

Figure 3:
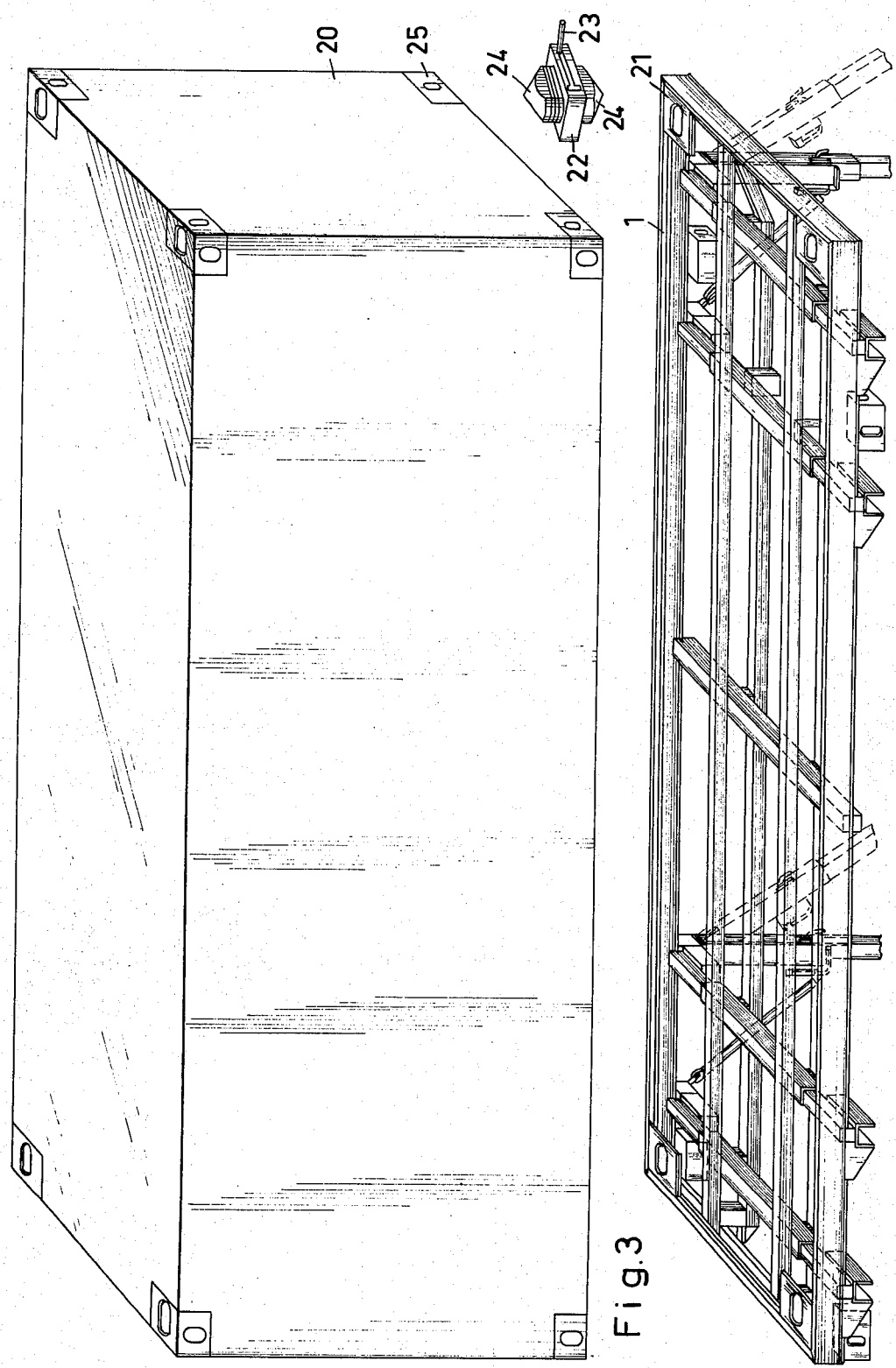
FIG. 3 shows the base frame of FIG. 1, but provided with a device for mounting a container thereon.

A further embodiment of the invention is shown in FIG. 3, wherein the base frame 1 has mounting plates 21 located at its four corners. These plates are aligned with the corner fittings 25 of a container 20 to be carried by the base frame 1, and are provided with at least one aperture for mounting a double locking mechanism 22 which connects the respective mounting plate 21 to a corresponding corner fitting 25. Each of the mechanisms 22 includes a hand lever 25 by means of which an upper and a lower locking pin 24 can each be turned through 90° between locking and unlocking positions.

Figure 4:
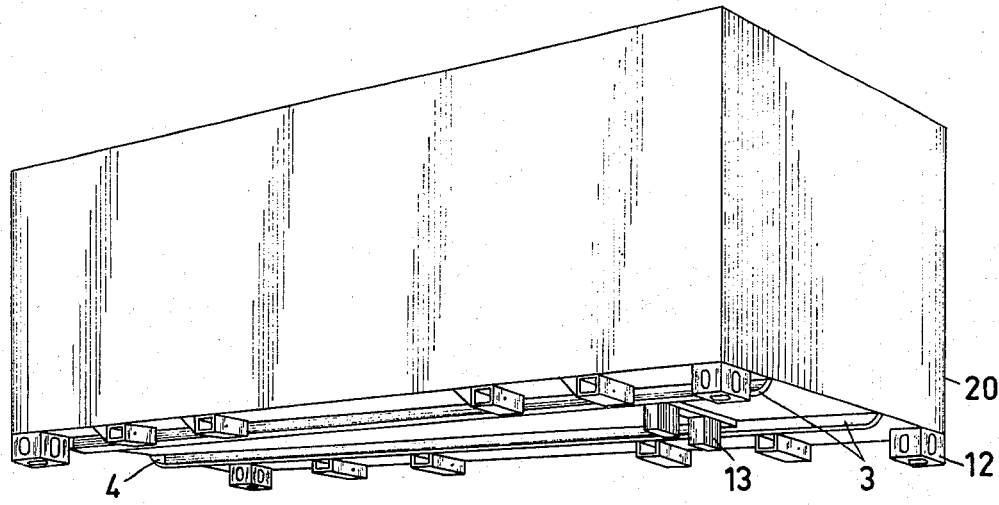
FIG. 4 shows a container having an intergal base frame.

FIG. 4, finally, shows an embodiment wherein a container 20 has its bottom wall formed directly as a base frame 1 of the present invention. In all respects the base frame of FIG. 4 corresponds to the base frame of FIG. 1 and will cooperate with a chassis frame 14 in the same manner as previously described, except that the components of the base frame 1 of FIG. 1 are in FIG. 4 mounted directly on the bottom wall of the container 20. The container 20 may, of course, also be constituted by the body or superstructure of a trailer.

It will be understood that each of the elements described above, or two or more together, may also find a useful application in other types of constructions differing from the types described above.

While the invention has been illustrated and described as embodied in a motor vehicle construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

What is claimed as new and desired to be protected by Letters Patent is set forth in the appended claims:

1. In a motor vehicle movable forwardly and backwardly in a normal direction of travel, the combination comprising: a load-supporting horizontal base frame elongated in said direction and having relative to said direction a front end portion and a rear end portion; a plurality of elongated support legs on said frame each having an upper end pivoted on said frame and a lower end engageable with the ground, each of said legs being pivotal on said frame between a support position with its lower end standing on the ground and extending generally vertically between said base frame and the ground, and a loading position with its lower end behind its upper end and engaging the ground and extending backwardly in said direction from said base frame; a curved downwardly convex plate on each of said lower ends; mounting means on said base frame for movement of each of said legs horizontially transverse to said direction; a vehicle-mountable chassis frame having a front end portion and a rear end portion, said rear end portion of said chassis frame forming a pair of interengageable - portions with and being engageable under the front end portion of said base frame on displacement of said chassis frame backwardly in said direction relative to and under said base frame; at least one of said interengagable portions being formed with a ramp engageable with the other of said interengagable portions, whereby movement of said chassis frame underneath said base frame is facilitated; an abutment of said base frame extending downwardly therefrom; a traverse support on said chassis frame having a rearwardly facing surface engageable with said abutment on backward displacement of said chassis frame relative to said base frame to simultaneously displace said base frame backwardly and pivot said legs from said loading into said support positions; and means at each of said legs for locking same in said support position after pivoting of the respective leg from said loading into said support position.

2. A combination as defined in claim 1, wherein said mounting means includes for each of said legs a beam member slidable transversely of said base frame, and a bracing strut having opposite ends connected to the respective beam member and leg.

3. A combination as defined in claim 1, said base frame having four corners, a mounting plate at each of said corners and adapted to be engaged with respective corner fittings of a base frame superstructure, each plate having apertures for mounting of a double-locking mechanism adapted to connect the plate to the engaging corner fitting.

4. A combination as defined in claim 1, wherein said base frame is the bottom wall of a transporting container.

5. A combination as defined in claim 1, wherein said chassis frame comprises two transversely spaced longitudinal centering rails.

6. A combination as defined in claim 5, wherein said guide ramps are provided on said base frame.

7. A combination as defined in claim 1, wherein said mounting means includes for each of said legs a beam member slidable transversely of said base frame, and a bracing strut having one end connected to the respective leg and another end rigid with the respective beam member.

8. A combination as defined in claim 1, wherein each supporting plate has an edge portion facing towards said first end of said base frame and provided with frictionincreasing means to facilitate engagement with the ground.

9. A combination as defined in claim 1, wherein each of said legs comprises two telescoped-together sections of profiled cross-section, and arresting means for arresting said sections against telescoping movement in a plurality of positions in which they are telescoped together to a greater or lesser extent.

* * * * *